United States Patent [19]
Penn et al.

[11] 3,826,879
[45] July 30, 1974

[54] RETRACTABLE ELECTRIC CORD REEL

[75] Inventors: William H. Penn; Gerald J. Eicher, both of Bloomington, Ill.

[73] Assignee: National Union Electric Corporation, Greenwich, Conn.

[22] Filed: Dec. 20, 1972

[21] Appl. No.: 316,683

[52] U.S. Cl. .......................... 191/12.4, 191/12.2 R
[51] Int. Cl. ............................................. H02g 11/02
[58] Field of Search ..................... 191/12.2 R, 12.4

[56] References Cited
UNITED STATES PATENTS
2,998,277 8/1961 Himel .............................. 191/12.2 R
3,542,172 11/1970 Meletti ............................ 191/12.2 R Primary Examiner—M. Henson Wood, Jr.
Assistant Examiner—D. W. Keen
Attorney, Agent, or Firm—Hibben, Noyes & Bicknell

[57] ABSTRACT

A retractable cord reel assembly comprises a stationary bracket and a cord reel having a pair of metal flanges which sandwich a non-conductive hub. Each of the flanges has a dished portion, one of the dished portions containing spring motor means for rewinding an electric cord on the reel and the other dished portion containing contact means for making electrical contact between a rotating end of the cord and stationary wires on the cord reel assembly. The cord reel assembly is compact and is constructed to minimize possibility of transferring an electrical shock to its user.

17 Claims, 10 Drawing Figures

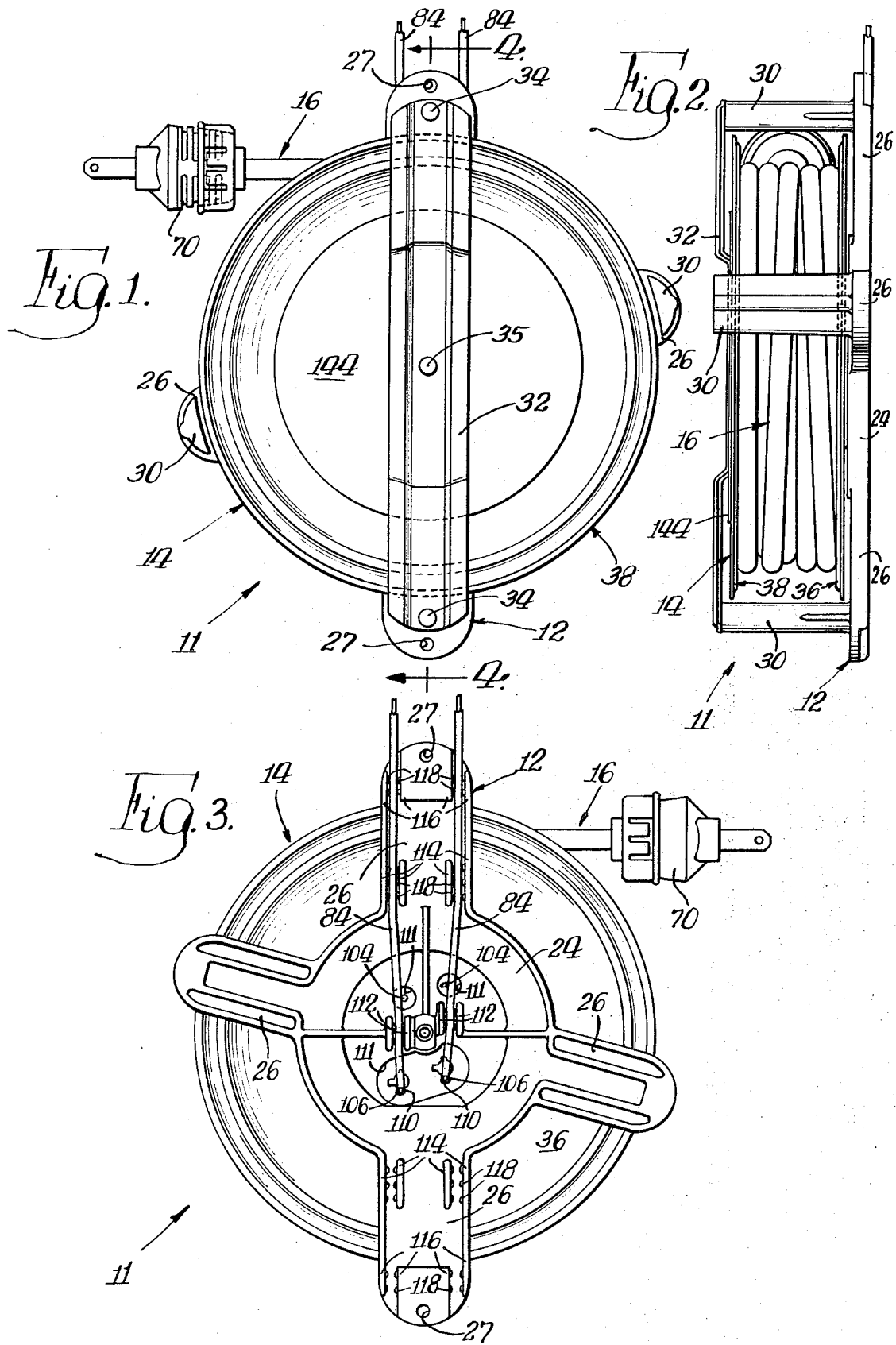

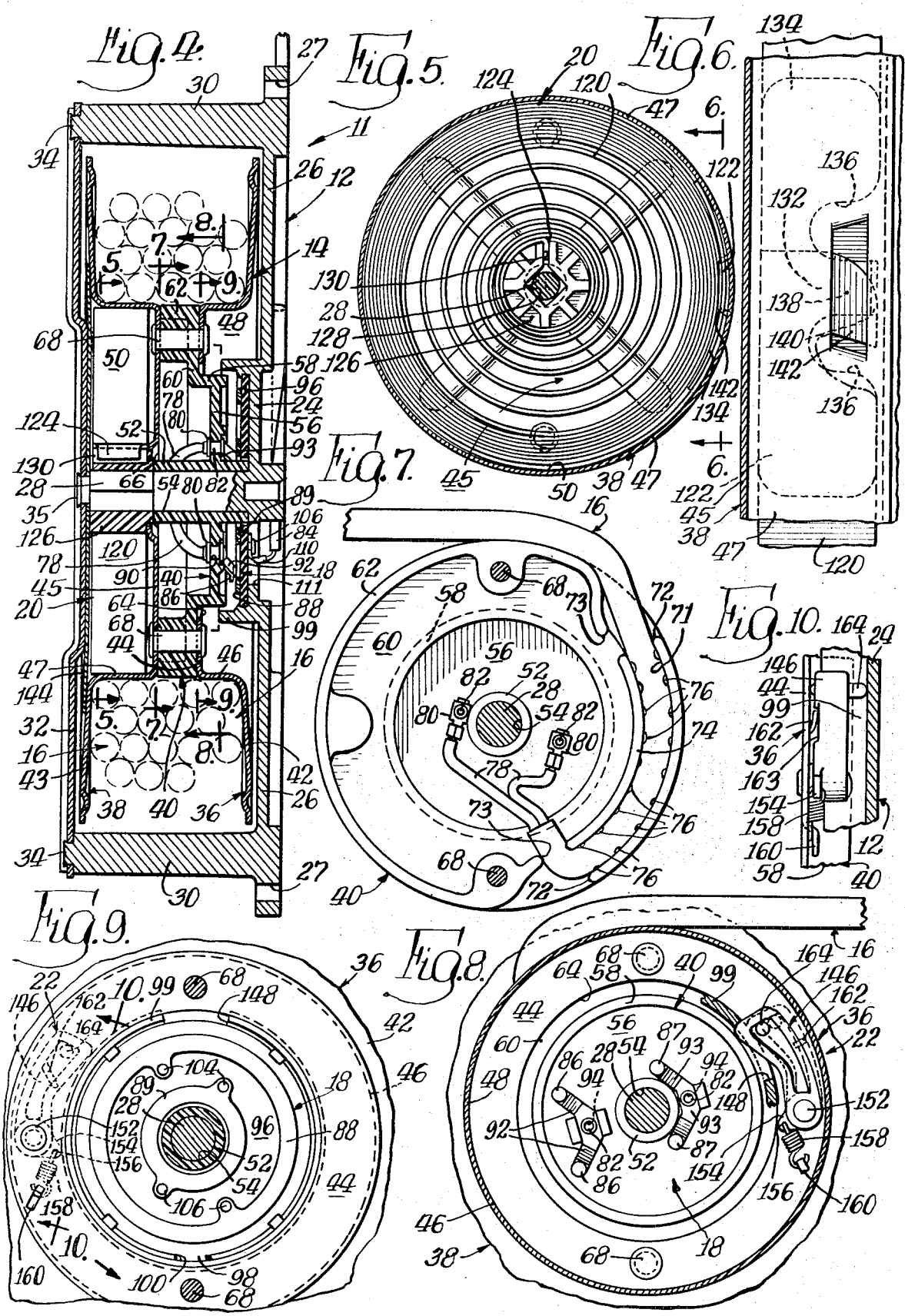

RETRACTABLE ELECTRIC CORD REEL

This invention relates to a cord reel assembly and move particularly to a retractable reel assembly for an electric cord.

Retractable cord reel assemblies have been used on various devices, such as vacuum cleaners, for retracting electric cords. The cord reel assembly usually is mounted internally in the device, is housed by the device, and is connected to a motor of the device. Such reel assembly generally comprises a stationary bracket mounted in the device and has an axle on which is mounted a cord reel. The assembly also includes spring motor means for rewinding an electric cord on the reel. Contact means are provided on the reel to connect a rotating end of the cord with corresponding stationary wires on the bracket. Heretofore, many such cord reels have been constructed entirely of metal since metal is durable, inexpensive and easily drawn or shaped. However, metal has the disadvantage of being electrically conductive, and should a wire become loose, the wire could contact such metal cord reel and transmit an electrical shock through the bracket and device to the user. Attempts have been made to minimize the chance of such electrical shock by making the entire cord reel of plastic. However, plastic cord reel assemblies are fragile and are easily broken.

Also, since the cord reel assembly is contained within another device, such as the vacuum cleaner, and generally must contain a large quantity of cord, it is advantageous to make the cord reel assembly, including mechanisms for rewinding the cord and connecting the rotating end of the electrical cord to the stationary wires, as compact as possible.

The cord reel assembly of the present invention comprises a metal bracket on which is rotatably mounted a cord reel. The cord reel includes a pair of metal flanges which sandwich a non-conductive hub. The assembly is constructed so that the flanges are electrically isolated from the bracket. The reel construction follows the double insulation principle so that should a wire of the cord reel assembly break loose, no electrical shock is transmitted to the user, the ends of the wires being either held in position or isolated so that an electrical shock cannot be transmitted from the cord reel assembly to the user. The contacting means and spring motor means are contained within the flanges of the cord reel, so that the assembly is very compact.

A primary object of the cord reel assembly of the present invention is to eliminate or reduce the chance of electrical shock.

Another object of the cord reel assembly of the present invention is to provide a compact construction.

Still another object of the cord reel assembly of the present invention is to provide a reel of composite construction having metal flanges and a non-conductive hub.

These and other objects of the present invention will become apparent from the following description and the accompanying figures of the drawings wherein:

FIG. 1 is a front elevational view of a cord reel embodying the present invention;

FIG. 2 is a side elevational view of the cord reel shown in FIG. 1;

FIG. 3 is a rear elevational view of the cord reel shown in FIGS. 1 and 2;

FIG. 4 is a cross-sectional view taken on the line 4—4 of FIG. 1;

FIG. 5 is a cross-sectional view taken along the line 5—5 of FIG. 4;

FIG. 6 is an enlarged fragmentary sectional view taken along the line 6—6 of FIG. 5;

FIG. 7 is a sectional view taken along the line 7—7 of FIG. 4;

FIG. 8 is a sectional view taken along the line 8—8 of FIG. 4;

FIG. 9 is a sectional view taken along the line 9—9 of FIG. 4; and

FIG. 10 is a fragmentary sectional view taken along the line 10—10 of FIG. 9.

A cord reel assembly 11 embodying the present invention is shown in FIG. 1 and comprises a bracket 12 for mounting the cord reel assembly, a cord reel 14, an electric cord 16 wound on the reel, rotary contact means 18 (FIG. 4) for one end of the cord, spring motor means 20 (FIG. 4) for rewinding the cord on the reel, and catch means 22 (FIG. 9) for retaining the cord reel in position. The cord reel assembly 11 is usable with a device, such as a vacuum cleaner, and is housed internally within the device and electrically connects its motor to a source of electricity.

In greater detail, the bracket 12 comprises a metal casting having a central portion 24 from which radially extend two pairs of arms 26. Two of the arms 26 have mounting holes 27 for securing the assembly 11 to the device. On the central portion 24 is an axle 28 on which is mounted the cord reel 14. The ends 30 of each of the arms 26 extend in an axial direction over the periphery of the cord reel 14 to help keep the cord 16 in place on the reel. A strap 32 is secured by integral rivets 34 formed on the ends 30 of the arms 26 and by an integral rivet 35 formed on the axle 28 to hold the cord reel 14 in place.

The cord reel 14 is of composite construction, comprising a pair of spaced metal flanges 36 and 38 which sandwich an electrically non-conductive center hub 40. Each flange 36 or 38 is generally disk-shaped having an outer radial wall portion 42 or 43 (FIG. 4) and an inner wall portion 44 or 45 joined by an axial intermediate wall portion 46 or 47 to form a dished portion or recess 48 or 50 for purposes hereinafter described.

The hub 40 is made of a non-conductive material, such as nylon or the like, which provides good electrical insulation and is also a lubric material having suitable bearing properties. The center hub 40 has a tubular inner axial portion 52 (FIG. 4) with an opening 54 which receives the axle 28 to provide a bearing for the cord reel 14. The hub 40 has an inner radial wall portion 56 which is joined to the inner axial portion 52. The inner radial wall portion 56 joins an intermediate axial wall portion 58 which in turn joins a second radial wall portion 60, the second radial wall portion 60 terminating in a peripheral axial wall portion 62.

The flange 36 adjacent the central portion 24 of the bracket 12 has an enlarged opening 64 (FIGS. 4 and 8) in its inner radial wall portion 44, and one end of the inner axial portion 52, the inner radial wall portion 56 and one end of the intermediate axial wall portion 58 of the hub 40 extend through this opening 64 in the flange 36. The flange 38 has a smaller axial opening 66 in its inner radial wall portion 45 which is slightly larger than the diameter of the inner axial portion 52 of the hub. The other end of the inner axial portion 52 of the hub 40 extends into this opening 66 in the flange 38. The flanges 36 and 38 and the hub 40 are assembled so that the inner radial wall portions 44 and 45 of the flanges abut opposite sides of the peripheral wall portion 62 of the hub, and portions 48 and 50 open away from each other. Two rivets 68 and two sets of corresponding rivet openings are provided in each of the flanges 36 and 38 and in bosses formed in the hub 40 to hold the reel 14 together.

The cord reel 14 is installed on the axle 28 so that, as shown in FIG. 4, the right end of the inner axial portion 52 of the hub 40 bears against the central portion 24 of the bracket 12, thus preventing the flange 36 adjacent the bracket from contacting the bracket.

The cord reel assembly 11 may be used in conjunction with an electrical device, for example a vacuum cleaner, and supplies electricity from a source, such as a wall outlet, to the motor of the device. The electric cord 16 has a conventional male plug 70 (FIG. 1) at its free end and is wound around the cord reel 14. The cord reel 14 is of sufficient size to hold the desired length of cord. As is shown in FIG. 4, the cord 16 is wound around the axial surface provided by the peripheral axial wall portion 62 of the hub 40 and the adjacent axial wall portions 46 and 47 of the flanges 36 and 38, and the wound cord is confined between the outer radial wall portions 42 and 43 of the flanges 36 and 38. The inner end portion of the cord 16 is retained in an arcuate groove or channel 71 in the hub 40 which is defined between the peripheral axial wall portion 62 and an inner concentric projecting wall 74, each of which has transverse teeth or ribs 76 for gripping the cord 16. The peripheral axial wall portion 62 is interrupted to provide a pair of end openings 72 for the groove 71, and the inner concentric wall 74 has a pair of openings 73. As seen in FIG. 7, the inner end portion of the cord 16 enters one of the end openings 72, extends through the channel 71, and is bent inwardly and passes through one of the openings 73. The two wires 78 of the cord 16 have terminals 80 which are secured by eyelets 82 to the inner radial wall portion 56 of the hub 40. As can be seen in FIG. 4, the terminals 80 of the cord 16 are confined within a space or chamber provided by the hub 40 and the flange 38 which is electrically isolated from the bracket 12. Thus, should one of the wires 78 become loose, it can contact only the hub 40 or flange 38 so that no shock is transferred to the bracket 12 and then to the device and its user.

Contact means 18 is provided to communicate electrical energy from the wires 78 secured to the rotating hub 40 to the stationary wires 84 (FIG. 3) provided on the bracket 12, and comprises contacts 86 and 87 and slip rings 88 and 89 located on the hub 40 and the bracket 12, respectively. The eyelets 82 pass through openings 90 (FIG. 4) in the hub and on the opposite side are connected to two pairs of arms 92 and 93 (FIG. 8) on which the contacts 86 and 87 are mounted. The arms 92 and 93 are made of flexible metal, and each pair of arms has a center opening 94 for receiving the eyelet 82. Each eyelet 82 is peened over to hold one pair of arms 92 or 93 and one terminal 80 in place on the hub 40. The two contacts 86 on the arms 92 engage one slip ring 88, and the two contacts 87 on the other arms 93 engage the other slip ring 89. The slip rings 88 and 89 are mounted on an insulated disk 96 of electrically non-conducting material which is seated in a circular recess provided by an axially projecting flange 99 on the bracket 12. The insulated disk 96 has a small radial projection 98 (FIG. 9) which engages a corresponding slot 100 formed in the flange 99 of the bracket 12 to prevent the insulated disk 96 from rotating. The slip rings 88 and 89 have openings for eyelets 104 and 106 which pass through openings in the insulated disk 96. Two of the eyelets 106, one on each slip ring 88 or 89, also pass through terminals 110 (FIG. 3) of the wires 84 which are adapted to be connected to the motor of the device. The eyelets 104 and 106 are peened over to hold the slip rings 88 and 89 and the terminals 110 of the wires 84 in place on the disk 96. The areas of the bracket, indicated at 111, adjacent the eyelets 104 and 106 are removed to prevent making an electrical connection to the bracket 12. As can be seen in FIG. 3, the wires 84 run through three sets of closely spaced flanges or projections 112, 114, and 116 having small ribs or teeth 118 to hold the wires 84 in place. Thus, electricity can flow from the source (wall socket), through the plug 70, through the cord 16, to the contacts 86 and 87 (FIG. 8), through the slip rings 88 and 89 (FIG. 9), to the two wires 84 (FIG. 3), and then to the motor of the device. As can be seen in FIG. 4, since the contacts 86 and 87 and slip rings 88 and 89, just described, are located in the dished portion 48 of the flange 36, a very compact structure is provided.

The spring motor means 20 (FIG. 5) for rewinding the cord 16 on the cord reel 14 is housed in the dished portion 50 of the flange 38. The spring motor 20 comprises a flat, elongated steel strip 120 wound in the conventional manner. The strip 120 has its outer end 122 secured to the flange 38 and has its inner end 124 indirectly secured to the axle 28 through an electrically non-conductive bushing 126. The bushing 126 has a square interior opening 128 which fits on a similarly shaped portion of the axle 28 (FIG. 4) to prevent the bushing from rotating. On the periphery of the bushing 126 is an axial slot 130 which receives a bent edge of the inner end 124 of the strip 120. The bushing 126 is preferably made of nylon or the like and is electrically non-conductive and isolates the spring strip 120 from the axle 28 so that should the strip touch the flange 38, no electrical shock can be transmitted to the bracket 12.

The outer end 122 of the spring motor strip 120, as shown in FIG. 6, has a hooked end 132, the neck of the hook being about one-half the width of the strip 120. In order to prevent this narrow neck from failing due to fatigue, a reinforcement clip 134 (FIG. 6) is provided. The reinforcement clip 134 is made of steel and is substantially thicker than the strip 120 of the spring. The reinforcement clip 134 is generally a flat rectangular member having two cutaway portions 136 on either side of its center 138. The free end of the center 138 of the reinforcement clip has a radially and inwardly extending bent edge 140 to prevent the clip from becoming dislodged.

As is shown in FIG. 6, a small portion 142 of the intermediate axial wall portion 47 of the flange 38 is slit and displaced inwardly to form a pocket or recess. The hook end 132 of the strip 120 and the center 138 of the reinforcement clip 134 are engaged in the pocket, the spring strip end portion 122 being sandwiched between the clip 134 and the remainder of the axial wall portion 47 of the flange 38. The bent edge 140 on the center 138 of the clip 134 engages the edge of the displaced portion 142 to retain the clip in position. As is shown in FIG. 6, the clip 134 is of sufficient length to extend beyond the narrow neck of the strip 120. Thus, any bending force exerted on the end portion of the spring strip 120 is transferred to the reinforcement clip 134 before reaching the narrowed neck of the hook end 132 of the spring strip. Only tension forces are exerted on the hook end of the spring strip, thus greatly reducing the possibility of failure and increasing the life of the spring motor 20.

An insulated disk 144 (FIGS. 1 and 4), for instance of paper, covers the spring motor 20 and the dished portion 50 in the flange 38. This disk 144 prevents the spring strip 120 from accidently touching the strap 32 of the bracket 12 to insulate the reel 14 from the bracket 12.

Catch means 22 (FIGS. 8, 9 and 10) is provided in the dished portion 48 of the flange 36 to retain the cord reel 14 in position with the cord 16 withdrawn from its fully wound position. The catch means 22 comprises a pawl 146 mounted on the flange 36 and a notch 148 formed in the flange 99 of the bracket 12. The pawl 146 is pivotally mounted on a spacer bushing which is secured by a rivet 152 to the inner radial wall portion 44 of the flange 36. The pivoted end of the pawl 146 has a small extending arm 154 with an opening 156 therein. The opening 156 receives one end of a spring 158 to force the pawl to engage with the notch 148, as shown in FIG. 8 in solid lines. When disengaged from the notch 148, the pawl 146 rides on the flange 99, as shown in dashed lines in FIG. 8. The other end of the spring 158 is secured to a small tab 160 formed on the wall portion 44 of the flange 36. A similar tab 162 is also provided on the flange 36 for use when the cord reel is mounted for rotation in the opposite direction, as described below. A cutout 163 (FIG. 10) is provided in the pawl 146 to clear the tab 162 as the pawl pivots. At the end of the pawl 146 which engages the notch 148 is a pin or protuberance 164 that rides against the bracket 12 to guide the pawl.

The operation of the cord reel assembly 11 of the present invention is as follows: The user withdraws the cord 16; the cord reel 14 rotates on the axle 28 and when the desired length of the cord 16 is reached, the user lets the cord reel 14 rotate back slowly under the influence of the spring motor so that the pawl 146 engages in the notch 148 to retain the cord reel 14 in position. When it is desired to retract the cord 16, the user simply pulls the cord forward and the pawl 146 disengages from the notch 148 and then releases the cord. Upon the cord 16 being released, the spring motor means 20 rotates the cord reel 14 in the rewind direction with sufficient speed so that centrifugal force prevents the pawl 146 from engaging the notch 148 until the cord is completely rewound on the cord reel.

If the cord reel assembly is to be mounted for rotation in the opposite direction, a different spring motor, wound in the opposite direction, is used. Also an oppositely oriented pawl must be used since the location of the small arm 154 and the protuberance 164 of the pawl 146 would interfere with its operation. Further, the spring 158 for the pawl is connected to the other tab 162. Also, the cord 16 enters the hub 40 through the other openings 72 and 73 in channel 71.

From the foregoing description it is apparent that a novel and useful cord reel assembly comprising a metal bracket and a composite cord reel having a pair of metal flanges sandwiching a non-conductive hub has been provided. Each of the flanges has a dished recess containing either a spring motor for rewinding the cord on the reel or electrical rotating contact means for connecting a rotating end of the cord to stationary wires on the bracket. It is further apparent that the cord reel has been constructed to minimize the chance of electric shock being transmitted from the cord reel to the user thereof.

We claim:

1. A retractable cord reel assembly for an electric cord, said reel assembly comprising a conductive mounting bracket having an axle extending therefrom and stationary electric wires, a cord reel rotatably mounted on said axle and having a pair of separate spaced conductive flanges electrically isolated from said bracket and a separate non-conductive hub sandwiched between said separate flanges, said separate hub and separate flanges being secured together, said flanges having dished portions at opposite sides of said hub, said cord reel receiving one end of the electric cord which is adapted to be wound on said cord reel for storage, said one end of the cord rotating with said cord reel, one of said dished portions on one of said flanges containing a spring motor for rewinding the cord on said cord reel, and the other of said dished portions on the other of said flanges containing electrical contact means for connecting said rotating one end of the cord to the stationary electric wires, and catch means in one or the other of said dished portions cooperating between said cord reel and said bracket for holding said cord reel in a predetermined rotated position.

2. A cord reel assembly as in claim 1, wherein said catch means comprises a notch on said bracket, a pawl pivotally mounted in said other dished portion and a spring connected between said pawl and said other flange for urging said pawl into engaged relation with said notch.

3. A cord reel assembly as in claim 1, wherein said other flange has a central opening therein, said hub extending through said opening into said other dished portion of said other flange and adjacent said bracket, and said electrical contact means comprises contacts secured to one of said hub and bracket and cooperating slip rings secured to the other of said hub and bracket.

4. A cord reel assembly as in claim 1, wherein said one flange has a peripheral displaced portion providing a pocket in said one dished portion, said spring motor includes a coiled spring strip located in said one dished portion and having a hook formed on its outer end, said pocket receiving said hook, and the inner end of said spring strip being secured to said axle.

5. A cord reel assembly as in claim 4, wherein said spring motor further comprises a generally rectangular reinforcing clip having two cut-away portions adjacent a center portion, said pocket also receiving said center portion of said clip, said hook end of said spring being located between said clip and said one flange, whereby only tension force is transmitted to said hook end, any bending force being transferred to said clip.

6. A cord reel assembly as in claim 5, wherein said center portion of said clip has a radially and inwardly bent edge for engaging said displaced portion of said one flange to prevent said clip from being dislodged from said pocket.

7. A cord reel assembly as in claim 4, further comprising a non-conductive bushing fixedly secured on said axle, said inner end of said spring strip engaging and being retained by said bushing, and an insulated disk for closing said one dished portion containing said spring motor and electrically isolating said spring motor.

8. A cord reel assembly as in claim 1, wherein said hub has a peripheral wall with an opening to receive said one end of said cord, said hub having an inner axial portion extending between said flanges and adjacent said bracket, a radial wall extending from said inner axial portion to said peripheral wall, said one end of said cord being secured to said radial wall and contained within a chamber enclosed by said hub and said one flange.

9. A retractable cord reel assembly for an electric cord, said assembly including a mounting bracket having an axle, a cord reel rotatably mounted on said axle, said cord reel receiving one end of an electric cord adapted to be wound on said cord reel for storage, and a spring motor for rewinding said cord on said cord reel, said spring motor comprising a peripheral wall providing a pocket on said cord reel, a coiled strip with a hook formed on its outer end, and a generally rectangular reinforcing clip having two cut-away portions adjacent a center portion, said pocket receiving said hook and said center portion of said clip, said center portion of said clip having a radially and inwardly bent lip engaging said pocket of said cord reel to prevent said clip from being dislodged from said pocket, said center portion of said clip being located between said hook of said spring and said peripheral wall of said cord reel, the other end of said spring being secured to said axle, whereby only tension force is transmitted to said hook end, any bending force being transferred to said clip.

10. A retractable cord reel assembly for an electric cord, said reel assembly comprising a mounting bracket having an axle, a cord reel rotatably mounted on said axle and having a pair of separate flanges and a separate hub sandwiched between said separate flanges, said separate hub and said pair of separate flanges being secured together, said flanges having dished portions at opposite sides of said hub, said hub and flanges defining an annular space to receive said cord, said cord reel receiving one end of the electric cord which is adapted to be wound on said hub between said flanges of said cord reel for storage, said one end of the cord rotating with said cord reel, one of said dished portions on one of said flanges containing a spring motor for rewinding the cord on said cord reel, and the other of said dished portions on the other of said flanges containing electrical contact means for connecting said rotating one end of the cord to stationary electric wires, and catch means in one of said dished portions cooperating between said cord reel and said bracket for holding said cord reel in a predetermined rotated position.

11. A cord reel assembly as in claim 10, wherein said hub is made of electrically non-conductive material and said pair of flanges is made of electrically conductive material.

12. A retractable cord reel assembly for an electric cord, said cord reel assembly comprising: a metal mounting bracket having an integral axle and at least one pair of integral arms extending from one side, a strap secured to said arms and axle, and stationary electric wires; a cord reel rotatably mounted on said axle and having a first metal flange spaced from said bracket, a non-conductive hub abutting said first metal flange, and a second metal flange abutting said hub, said hub and flanges being secured together; each of said flanges having a dished portion on its side opposite said hub and a central opening therein; said hub having a tubular axial portion extending on said axle between said openings in said flanges and abutting said bracket, said hub having an opening on its periphery to receive one end of the electric cord; said one end of the cord rotating with and being secured to said hub, said one end of the cord being contained within a chamber provided by said hub and said second flange; contact means contained in said dished portion of said first flange, including contacts secured to said hub and connected to said one end of the cord and cooperating slip rings secured to said bracket to connect said one end of the cord to said stationary electric wires on said bracket; catch means contained in said dished portion of said first flange, including a notch formed in said bracket, a pawl mounted on said first flange, and a spring connected between said first flange and said pawl; said second flange having a peripheral pocket in its dished portion; and a spring motor contained in said dished portion of said second flange, including a coiled strip with a narrowed neck and a hook at its outer end, a generally rectangular reinforcing clip having two cut-away portions adjacent a center portion, said center portion having a bent free end to prevent said clip from being dislodged from said pocket, said pocket receiving said hook and said center portion of said clip, said clip being located radially inwardly of said hook of said strip, a non-conductive bushing fixedly secured on said axle, the inner end of said strip engaging said bushing, and an insulated disk convering said coiled strip and closing said dished portion of said second flange.

13. A retractable cord reel assembly for an electric cord, said reel assembly comprising a mounting bracket having an axle extending therefrom and stationary electric wires, a cord reel rotatably mounted on said axle and having a pair of spaced flanges and a hub between said flanges, said flanges having dished portions at opposite sides of said hub, said cord reel receiving one end of the electric cord which is adapted to be wound on said cord reel for storage, said one end of the cord rotating with said cord reel, one of said dished portions on one of said flanges containing a spring motor for rewinding the cord on said cord reel, and the other of said dished portions on the other of said flanges containing electrical contact means for connecting said rotating one end of the cord to the stationary electric wires, and catch means in one or the other of said dished portions cooperating between said cord reel and said bracket for holding said cord reel in a predetermined rotated position, said one flange having a peripheral displaced portion providing a pocket in said one dished portion, said spring motor including a coiled spring strip located in said one dished portion and having a hook formed on its outer end, said pocket receiving said hook, and the inner end of said spring strip being secured to said axle, and a generally rectangular reinforcing clip having two cut-away portions adjacent a center portion, said pocket also receiving said center portion of said clip, said hook end of said spring being located between said clip and said one flange, whereby only tension force is transmitted to said hook end, any bending force being transferred to said clip.

14. A cord reel assembly as in claim 13, wherein said center portion of said clip has a radially and inwardly bent edge for engaging said displaced portion of said one flange to prevent said clip from being dislodged from said pocket.

15. In a retractable cord reel assembly for an electric cord, including a mounting bracket having an axle, a cord reel rotatably mounted on said axle, said cord reel receiving one end of an electric cord adapted to be wound on said cord reel for storage, said cord reel having a peripheral wall providing a pocket on said cord reel, and a coil strip spring motor for re-winding said cord on said cord reel, said strip having a hook formed on its outer end, said pocket receiving said hook, the other end of said strip being secured relative to said axle: the improvement comprising a generally rectangular reinforcing clip having two cut-away portions adjacent a center portion, said pocket receiving said center portion of said clip, said center portion of said clip being located radially inwardly of said hook of said spring, whereby only tension force is transmitted to said hook, any bending force being transferred to said clip.

16. The structure as in claim 15, wherein said center portion of said clip has a radially inwardly bent lip for engaging said pocket of said cord reel to prevent said clip from being dislodged from said pocket.

17. A retractable cord reel assembly for an electric cord, said cord reel assembly comprising: a conductive metal mounting bracket having an integral conductive metal axle and stationary electric wires; a composite cord reel including a first conductive metal flange spaced from said bracket, a non-conductive hub having one end abutting said first metal flange, and a second conductive metal flange, the other end of said hub abutting said second metal flange, means for securing said non-conductive hub and metal flanges together, said non-conductive hub being made of bearing material and having an opening for receiving said metal axle to journal said reel for rotation on said metal axle, each of said metal flanges having a dished portion on its side opposite said non-conductive hub and a central opening therein; said non-conductive hub having a tubular axial portion extending on said metal axle between said openings in said metal flanges to position said metal flanges and abutting said bracket to hold said first metal flange away from said bracket, said non-conductive hub having an opening on its periphery to receive one end of the electric cord; said one end of the cord rotating with and being secured to said hub, said one end of the cord being contained within a chamber provided by said non-conductive hub and said second metal flange; contact means contained in said dished portion of one of said metal flanges, a spring motor contained in said dished portion of the other of said metal flanges, and catch means contained in said dished portion of one or the other of said metal flanges.

* * * * *